INVENTORS
George A. Pinter
Ernest W. Walter
BY
Frease, Bishop, Johns & Schick
ATTORNEYS 3,157,387
AUTOMATIC TIRE SPREADER
George A. Pinter, Alliance, and Ernest W. Walter, Canton, Ohio, assignors to Van-Kay, Inc., Canton, Ohio, a corporation of Ohio
Filed Nov. 6, 1962, Ser. No. 235,626
2 Claims. (Cl. 254—50.3)

This invention relates to a device for spreading and rotating tires for whatever purpose desirable.

For many years the automobile tire industry has needed a device for spreading tires for purpose of inspection and maintenance. Indeed, the tire manufacturers and tire repair shops have been confronted with the problem of holding a tire upright, spreading the beads apart for adequate inspection, and for simultaneously rotating the tire. Some devices have been provided but have not completely overcome the problem for various reasons.

Prior tire spreaders have been only semi-automatic and therefore not completely relieved the operator of the necessity of performing some manual operations which are time-consuming and costly. For example, tire spreaders have existed which would spread the beads of the tire but would not rotate the tire simultaneously while holding the beads apart. Other tire spreaders have been inadequate because they have not been adapted to handle tires of varying sizes ranging from the smaller automobile tires to tires of tractors and airplanes.

Previous spreaders had been adapted to accommodate tires of limited sizes, which spreaders increased in size according to the sizes of tires. Moreover, the tire manufacturers do not have an adequate spreader for visual and X-ray inspection of interior side walls. For large aircraft tires X-ray inspection is a necessity and the speed of rotation of the tire during such inspection varies with the size and thickness of the tire casing. The speed may vary from 6 to 35 feet per minute.

In tire repair shops where defects must be inspected and repaired prior to tire spreading apparatus has not been readily adaptable for all purposes and frequently have been discarded as completely unuseable. Such shops have resorted to other means for recapping tires.

The device of the present invention solves the difficulties of the prior devices in that it operates automatically to spread a tire to any desired opening and to rotate the tire simultaneously or intermittently as desired. The speed of rotation can be readily controlled.

Because of the foregoing advantages the arduous tasks of manually manipulating a tire in prior semi-automatic tire spreaders have been eliminated and thereby reduced costs and time both for inspecting and repairing tires.

In addition to the foregoing, the device is useful for recapping tires because curing bags and collapsible rims can be installed and used more readily, thereby facilitating recapping while simultaneously rotating the tire.

It is a general object of this invention to provide an improved automatic tire spreader which accommodates a tire of any known size for spreading the beads to the necessary width for inspection and repair.

It is another object of this invention to provide an automatic tire spreader which also rotates a tire either continuously or intermittently as desired while holding the tire at the desired opening.

It is another object of this invention to provide an automatic tire spreader which is used for recapping tires with curing bags and collapsible rims mounted therein for recapping purposes and while rotating the tires.

Finally, it is an object of this invention to provide an automatic tire spreader which eliminates the difficulties heretofore encountered in the art; satisfies the requirements long sought for in inspection and recapping of tires; and achieves the stated objects in a simplified and inexpensive manner.

These and other objects and advantages, apparent to those skilled in the art from the following description and claims, may be obtained, the stated results achieved, and the described difficulties overcome, by the apparatus, combinations, parts, elements, subcombinations, arrangements and constructions which comprise the present invention, the nature of which is set forth in the following general statement, a preferred embodiment of which—illustrative of the best mode in which applicants have contemplated applying the principles—is set forth in the following description and shown in the drawings, and which are particularly and distinctly pointed out and set forth in the appended claims forming part hereof.

The nature of the improved automatic tire spreader construction of the present invention may be stated in general terms as including a base, movable endless belt means for supporting and rotating a tire on the base, motor means for operating the continuous belt means at varying speeds and in reverse directions, a pair of oppositely disposed means for spreading the beads of a tire, each pair of said spreading means including roller means for engaging the inner surface of a bead and extending into the interior of the tire, said spreading means also including motor means for separating the roller means on each pair of spreaders and tire support means for reversely rotating a tire through 360°.

By way of example, an embodiment of the improved automatic tire spreader is shown in the accompanying drawings, in which:

FIG. 5 is an enlarged vertical sectional view taken on the line 5—5 of FIG. 3; and FIG. 6 is an enlarged fragmentary sectional view taken on the line 6—6 of FIG. 3.

Similar numerals refer to similar parts throughout the drawings.

Figure 1:
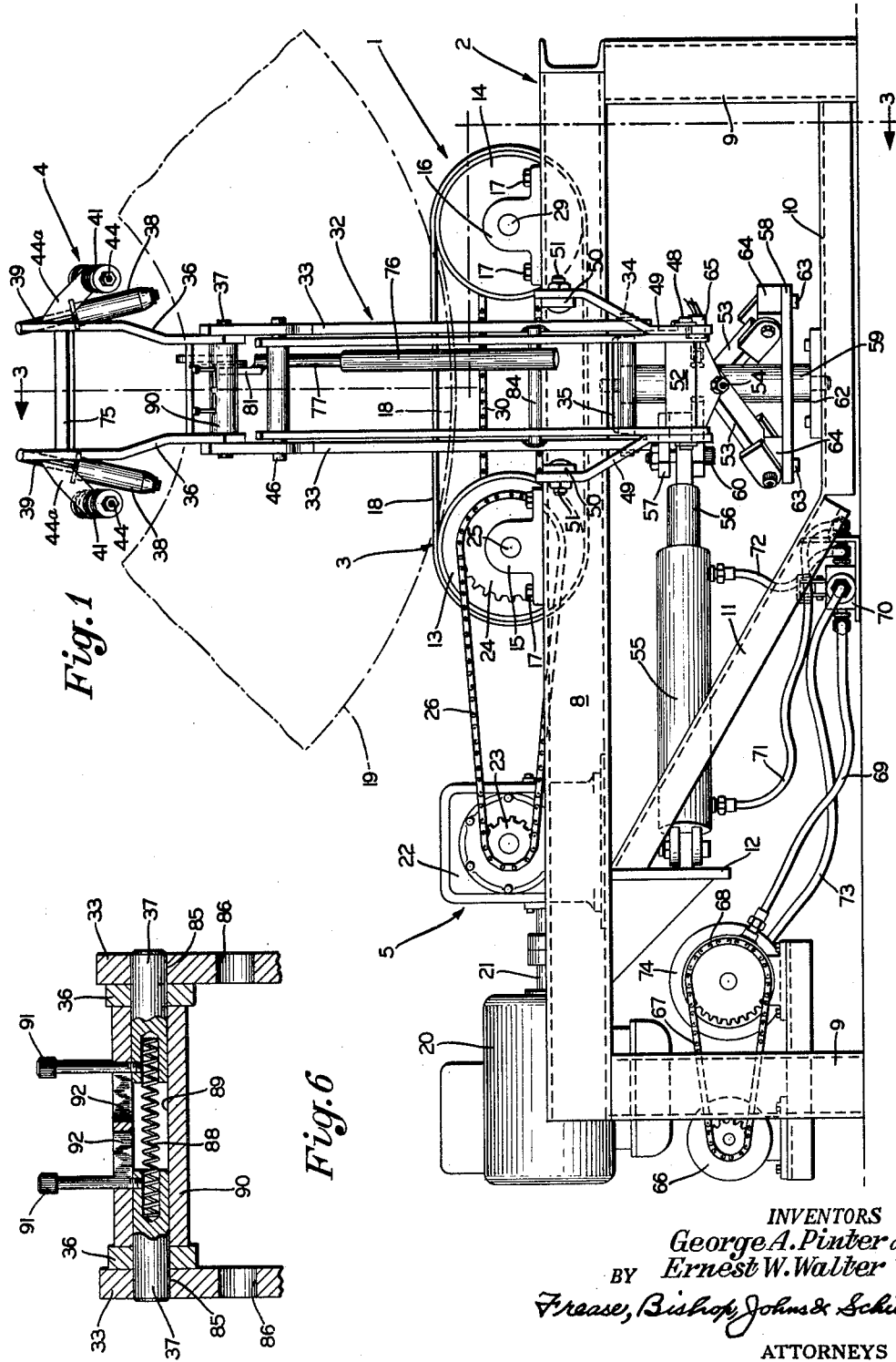
FIG. 1 is an elevational view of the tire spreader with the fragmentary portion of a tire shown in broken lines.

The improved automatic tire spreader is generally indicated at 1 in FIG. 1. It includes a base 2, means 3 for mounting and rotating a tire, means 4 for spreading the beads and side walls of a tire, means 5 for actuating the tire mounting means 3, and means generally indicated at 6 for actuating the tire spreading means 4.

The base 2 includes a pair of horizontal parallel frame members 7 and 8, the opposite ends of which are supported by vertical legs 9. The base also includes a pair of lower horizontal frame members 10 having inclined upturned portions 11, the upper ends of which are secured to a mounting plate 12 on the underside of and extending between the frame members 7 and 8. All of the frame members 7, 8 and 10, as well as the legs 9 are preferably composed of angle or channel steel and are secured together by welds in a conventional manner.

The tire mounting means 3 includes a pair of spaced rollers 13 and 14, the ends of which are mounted in similar journals 15 and 16, respectively. The journals for each roller 13 and 14 being mounted on the frame members 7 and 8 by similar bolts 17 hold the rollers in place above and between the frame members. A continuous belt 18 is disposed over and between the rollers 13 and 14 for supporting a tire 19 and for rotating the tire in either direction.

The means 5 for operating the tire mounting means 3 includes a reversible electric motor 20 having a drive shaft 21 operating a gear box 22 which in turn drives a sprocket 23. Said means also includes a sprocket 24 on the shaft 25 of the roller 13 and a continuous link chain 26 disposed between and over the spaced sprockets 23 and 24.

Figure 2:
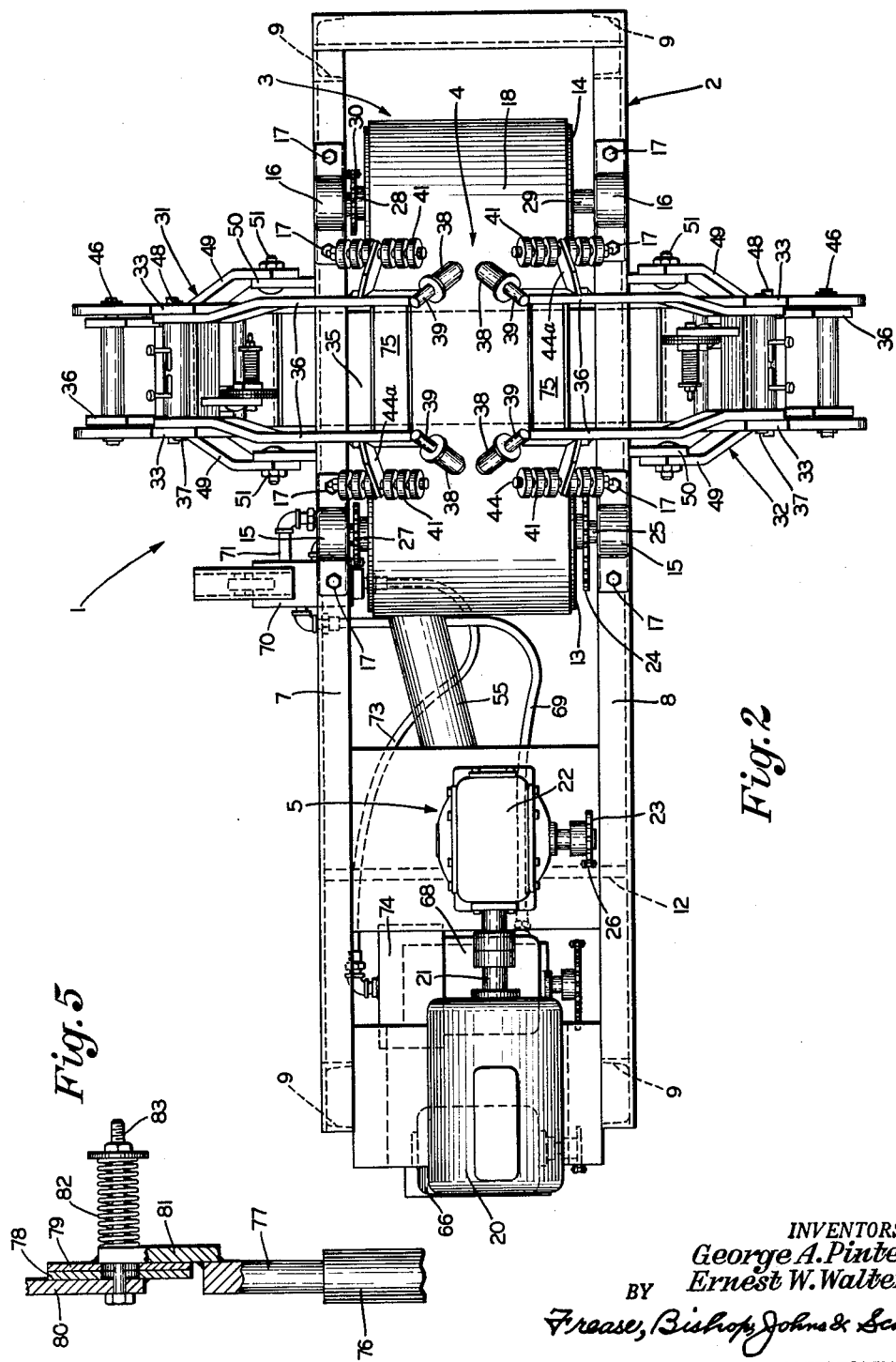
FIG. 2 is a plan view of the tire spreader.

Moreover, the means 5 includes a pair of sprockets 27 and 28 (FIG. 2) which are mounted on corresponding roller shafts 25 and 29 of the rollers 13 and 14. A continuous link chain 30 is disposed between and around the sprockets 27 and 28 for driving the roller 14 as well as the roller 13 to provide immediate and positive drive in either direction for rotation of the tire 19.

Figure 3:
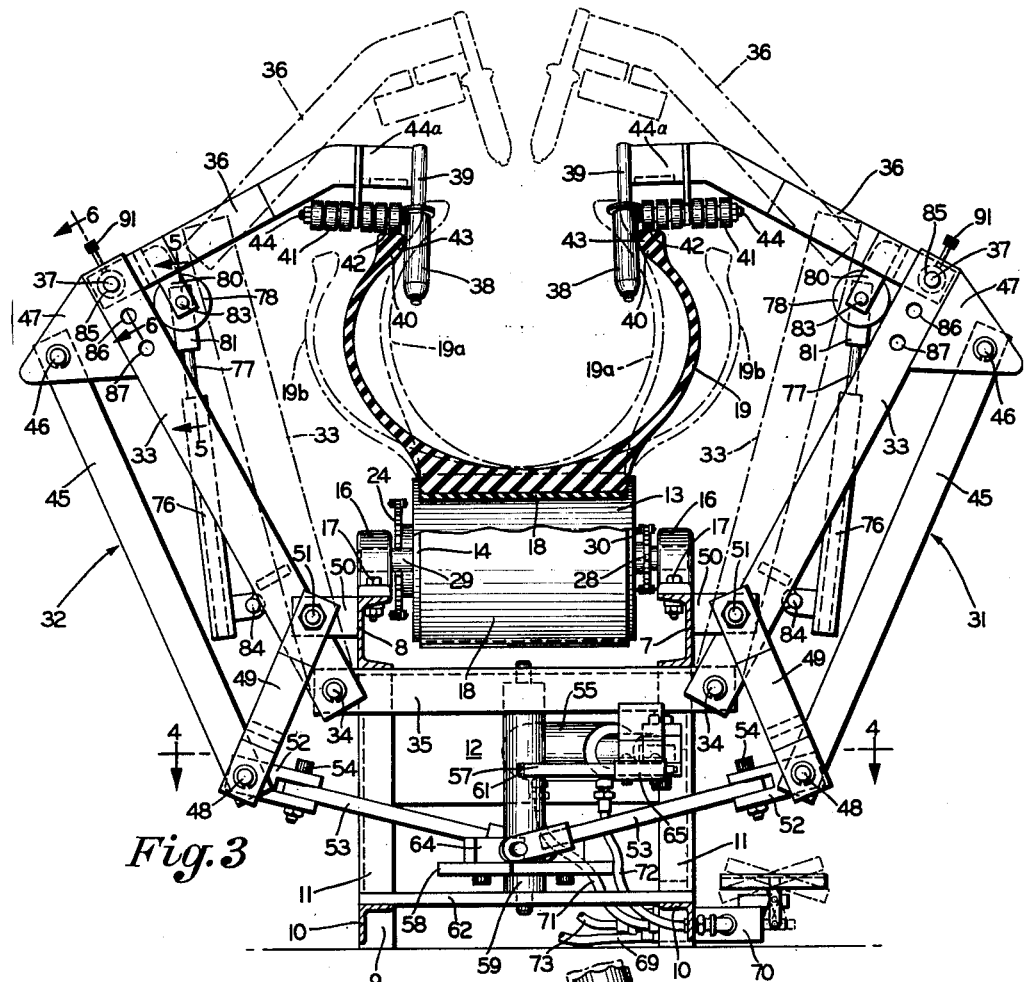
FIG. 3 is a vertical sectional view showing the spreader at an intermediate position of spreading a tire and showing another position in broken lines taken on the line 3—3 of FIG. 1.

The tire spreading means 4 includes a pair of arm-like members generally indicated at 31 and 32 (FIGS. 2 and 3) on each side of the tire mounting means 3 for engaging the inner opposite sides of the beads of a tire and for spreading the beads apart to any distance sufficient for proper inspection of the inside surface of the tire. Each arm 31 and 32 includes a pair of upwardly extending levers 33 which are pivoted at their lower ends on similar pivot pins 34. Each pivot pin 34 is secured to the side of the base 2 at the ends of a channel bar 35, which is shown in FIG. 3. At the upper ends of the levers 33 a pair of lever extensions 36 are pivotally mounted on pins 37 and extend inwardly toward the tire 19.

The means 4 for spreading the tire beds includes tire-engaging rollers 38 which are mounted on shafts 39. The upper end of each shaft 39 is secured to the inner ends of each lever extension 36. Each tire-engaging roller 38 is a cyindrical member and is rotatably mounted on the lower portion of the shaft 39. As shown in FIG. 3 the tire-engaging rollers 38 are engageable with the inner surface of opposite beads 40 of the tire 19. The rollers 38 are manually inserted in the position (FIG. 3) by an operator by raising and lower the lever extensions 36 about the pins 37.

Each lever extension 36 is provided with a plurality of rollers 41 which ride on the radial surface 42 of the bead 40 when the rollers 38 are inserted into the tire 19 and which hold the rollers 41 at a proper level in contact with the inner bead surface 43. The rollers 41 are mounted on shafts 44 which are separately mounted on positioning members 44a at the upper end portion of each lever extension 36. Each member 44a is inclined downwardly and outwardly from the corresponding extension 36.

The means for rotating the levers 33 about their pivot pins 34 includes links 45 the upper ends of which are attached by pivot pins 46 to lever plates 47 at the upper ends of the levers 33. The lower ends of the links 45 are attached by pivot pins 48 to a pair of spaced connecting bars 49. The upper ends of the bars 49 are pivotally attached to mounting brackets 50 by bolts 51. Moreover, the means for moving the levers 33 include a clevis 52 through which the pivot pin 48 extends for connecting the pin to a link 53 by a pivot pin 54.

Figure 4:
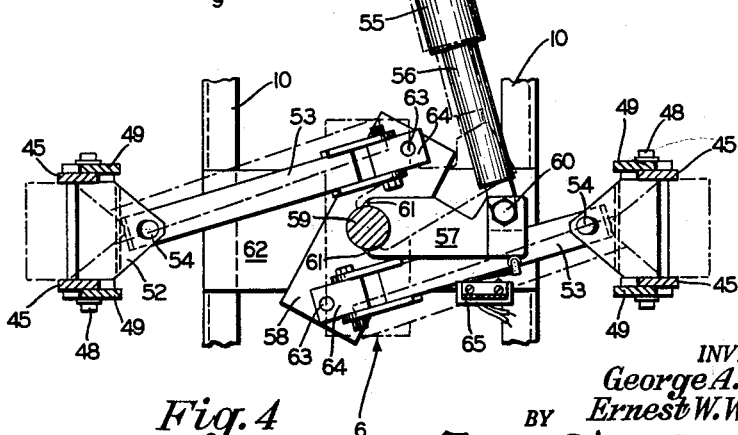
FIG. 4 is a fragmentary horizontal sectional view taken on the line 4—4 of FIG. 3.

As shown in FIGS. 1 and 4, the means 5 for operating the spreader arms 31 and 32 include a hydraulic cylinder 55 having a piston rod 56, a pivoting link 57 and a turn plate 58 which is mounted on a pivot shaft 59. The pivoting link 57 is attached to the outer end of the rod 56 by a pivot nut 60. The inner end of the link 57 is fixedly secured to the shaft 59 by welds 61. The plate 58 is similarly welded to the shaft 59. The lower end of the shaft 59 is rotatably mounted in the horizontal portion of the mounting bar 35 (FIG. 1) and the lower end is rotatably mounted in a plate 62 which extends between the frame members 10.

The lower end of each link 53 is pivotally mounted on the plates 58 by a pin 63 with a clevis 64. Accordingly, when the hydraulic cylinder 55 is actuated to extend the piston rod 56 outwardly, it rotates the plate 58 in the clockwise direction which pulls the upper ends of the arms 53 outwardly and thereby spreads the beads 40 of the tire 19. Conversely, when the piston rod 56 is drawn into the cyinder 55 the plate 58 rotates counterclockwise as viewed in FIG. 4, and thereby brings the upper ends of the lever extensions 36 together and permits the beads 40 of the tire 19 to return to a normal position.

In order to prevent several parts of the turning mechanism to be damaged by over-extension of the piston rod 56, an electric limit switch 65 is provided to limit the outward extension of the rod 56.

The operating means 5 for the tire spreading means 4 also includes a hydraulic system having a motor 66 which by a link chain 67 operates a hydraulic pump 68 which drives hydraulic fluid through a conduit 69 to a foot-operated reversing valve 70. The valve directs fluid either through a conduit 71 or 72 for moving the rod 56 out of or into the cylinder 55. A return conduit 73 leads from the valve 70 to a hydraulic reservoir tank 74.

As indicated above, the lever extensions 36 are pivotally mounted by pivot pins 37 at the upper ends of the levers 33. Although the rollers 38 are manually placed in the position shown in FIG. 3, such as by grasping of a spacing bar 75 (FIG. 1) by an operator, the manipulation of the lever extensions 36 is facilitaed by an extension support means which includes an elongated tube 76, a rod 77, and a pair of friction plates 78 and 79.

As shown in in FIG. 5, the friction plate 78 is attached to a bracket 80 and the friction plate 79 is mounted at the upper end of the rod 77 on a rod extension 81. The plates 78 and 79 are held in friction-tight surface-to-surface contact with each other by a coil spring 82 and nut and bolt assembly 83 which extends through the bracket 80, the plates 78 and 79, the extension 81 and the spring 82 as shown in FIG. 5. The friction between the plates 78 and 79 is adjustable by the spring 82 and is sufficient to hold the lever extension 36 in any desired position by manual manipulation. As shown in FIG. 3, the rod 77 extends into and is axially movable in the top 76, the lower end of which is pivotally attached to the extension 33 by a pivot pin 84.

In order to accommodate tires of smaller size than that shown in FIG. 3, the pivot pins 37 may be lowered from the opening 85 to lower openings 86 or 87, depending upon the size of the tire.

As shown in FIG. 6, the pivot pins 37 are held in their extended positions by a coil spring 88 which spring and pins are seated within a bore 89 of a spacer 90 which extends between the lower ends of the extensions 36. The pins 37 on each assembly 36 are movable inward against the pressure of the spring 88 by thumb pins 91, one of which is attached to the inner end of each pin 37 and which extends upward through a longitudinal slot 92 for each pin. Thus, the lower end of each extension assembly may be placed in any of the openings 85, 86 and 87 in which the lower openings 87 accommodate smaller tires and the openings 85 accommodate the larger tires.

In operation, the tire 19 is mounted on the belt 18 and the rollers 38 are placed into the opening of the tire between the beads 40. The levers 36 are then moved to wider spaced positions by the hydraulic system whereby the tire is spread from the normal position, shown by broken lines 19a, to the solid line position. If necessary the tire may be spread further to the broken line position of 19b.

Simultaneously, the tire may be rotated by actuating the motor 20 whereupon the rollers 13 and 14 turn the belt 18 in either direction. During turning of the tire 19, the rollers 38 and 41 engaging the outer surface of the bead 40 rotate on the bead as the tire turns. In the alternative, the tire may be spread without turning depending upon the particular operation to be performed on the tire whether inspection or repair.

The device of the present invention provides means for not only spreading the beads of the tire but also for rotating the tire simultaneously. In that respect the device satisfies a long-existing need for a tire spreader which also rotated the tire through 360°. During rotation of the tire with the beads in the spread position, the bead engaging rollers provide a minimum of friction on the beads. Whatever friction does exist is overcome by the extensive surface-to-surface contact between the tire and the continuous belt which is sufficient to turn the tire in either direction.

Moreover, the device is applicable to the tires of varying sizes and is, therefore, useful for inspection by tire manufacturers as well as for tire maintenance purposes by tire repair and service businesses.

In the foregoing description certain terms have been used for brevity, clearness and understanding, but no unnecessary limitations have been implied therefrom as such words are used for descriptive purposes and are intended to be broadly construed.

Moreover, the embodiments of the improved construction illustrated and described herein are by way of example and the scope of the present invention is not limited to the exact construction shown.

Having now described the invention, construction, operation and use of a preferred embodiment thereof and the advantageous, new and useful results obtained thereby; the new and useful atuomatic tire spreader and reasonable mechanical equivalents thereof obvious to those skilled in the art are set forth in the appended claims.

We claim:

1. In a device for inspecting pneumatic tire casings wherein means for rotating a tire in the upright position are mounted on a base, and wherein a pair of opposed tire spreader arms are mounted on opposite sides of said rotating means; the improvement in which each spreader arm includes an elongated lever, a lever extension, and a link, each lever having a lower end pivotally mounted on the base, the lever extension being pivotally mounted on the upper end of the lever, tire bead-engaging rollers on the upper end of the lever extension remote from the lever, means for rotating the arms about the lever pivot points between an upright position adjacent the tire rotating means and an inclined position away from said means, said rotating means including each link pivotally connected at one end to a corresponding lever and including a shaft rotatably mounted on the base and connected to the links of each arm, and reversible means for rotating the shaft on the base.

2. In a device for inspecting pneumatic tire casings wherein means for rotating a tire in the upright position are mounted on a base, and wherein a pair of opposed tire spreader arms are mounted on the base on opposite sides of said rotating means; the improvement in which each spreader arm includes an elongated lever, a lever extension, and a link, each lever having a lower end pivotally mounted on the base, the lever extension being pivotally mounted on the upper end of the lever and extends to a position above the tire rotating means and being movable vertically to bead-engaged and disengaged positions, tire bead-engaging rollers on the lever extension, the link on each arm having one end pivotally connected to the upper end of the lever, a rotatable shaft vertically mounted on the base below the tire rotating means and connected to the other end of the link, and means for rotating the shaft, whereby the shaft is rotated in one direction for spreading the arms outwardly in opposite directions from a tire and in the other direction for moving the arms together toward a tire on the tire mounting and rotating means.

References Cited in the file of this patent

UNITED STATES PATENTS

| | | |
|---|---|---|
| 1,371,480 | Harkins | Mar. 15, 1921 |
| 1,886,834 | Prentice et al. | Nov. 8, 1932 |
| 2,797,890 | Branick | July 2, 1957 |
| 2,895,711 | Branick | July 21, 1959 |
| 3,044,748 | Branick | July 17, 1962 |